United States Patent [19]

Nakahara et al.

[11] Patent Number: 5,139,980

[45] Date of Patent: Aug. 18, 1992

[54] METHOD FOR PRODUCTION OF INORGANIC OXIDE PARTICLES

[75] Inventors: Saburo Nakahara; Takahiro Takeda, both of Himeji; Mitsuo Takeda, Suita; Youji Akazawa, Himeji; Tadahiro Yoneda, Ibaraki, all of Japan

[73] Assignee: Nippon Shokubai Kagaku Kogyo Co., Ltd., Osaka, Japan

[21] Appl. No.: 505,700

[22] Filed: Apr. 6, 1990

[30] Foreign Application Priority Data

Apr. 7, 1989 [JP] Japan .................. 1-87066

[51] Int. Cl.$^5$ .................. C01B 13/14; B01J 35/08
[52] U.S. Cl. .................. 502/8; 423/335; 423/608; 423/610; 423/625; 501/12; 501/33; 502/10
[58] Field of Search .............. 423/335, 608, 625, 610; 502/8, 9, 10; 501/12, 33

[56] References Cited

U.S. PATENT DOCUMENTS

| | | | |
|---|---|---|---|
| 2,455,445 | 12/1948 | See et al. | 502/10 |
| 2,921,913 | 1/1960 | Alexander | 252/313.2 |
| 4,775,520 | 10/1988 | Unger et al. | 423/335 |
| 4,808,397 | 2/1989 | Albizzati et al. | 423/625 |
| 4,861,572 | 8/1989 | Sugoh et al. | 423/610 |
| 4,983,369 | 1/1991 | Barder et al. | 502/8 |

FOREIGN PATENT DOCUMENTS

| | | | |
|---|---|---|---|
| 60-171228 | 9/1985 | Japan | 423/335 |
| 62-072514 | 4/1987 | Japan . | |
| 62-072516 | 4/1987 | Japan | 423/335 |
| 62-185439 | 8/1988 | Japan . | |
| 63-310714 | 12/1988 | Japan | 423/335 |

Primary Examiner—Gary P. Straub
Assistant Examiner—Ngoc-Yen M. Nguyen
Attorney, Agent, or Firm—Burns, Doane, Swecker & Mathis

[57] ABSTRACT

A method for the production of inorganic oxide particles by a procedure comprising the steps of dispersing inorganic oxide particles as seed particles in a water-containing alcohol solution thereby preparing a suspension of said seed particles and adding a hydrolyzable and condensable organic metal compound to said suspension thereby effecting growth of said seed particles, which method further comprises causing the presence in said water-containing alcohol solution of an alkylene glycol having 2-8 carbon atoms, in an amount in the range of 1 to 50% by weight, based on the amount of said water-containing alcohol solution.

12 Claims, No Drawings

METHOD FOR PRODUCTION OF INORGANIC OXIDE PARTICLES

BACKGROUND OF THE INVENTION

1. Field of the Invention

This invention relates to a commercially advantageous method for the production of inorganic oxide particles prevented from agglomerating into coarse lumps and allowed to acquire a freely controlled diameter. These particles are commercially valuable as a carrier for chromatography, as a raw material for catalysts, and as a filler for pigments, solid lubricants, and coating materials and for synthetic resins used in manufacture of fibers and films, for example.

2. Description of the Prior Art

In the methods heretofore adopted for the production of inorganic oxide particles, the method which comprises spraying a metal oxide sol in a compressed state into a heated nonpolar solvent thereby converting the sol into a gel, the method which comprises spray drying a metal salt solution and calcining, the method which comprises emulsifying a metal salt solution and consequently effecting interfacial polymerization of the metal salt, and the method which comprises subjecting a metal alkoxide to hydrolysis or pyrolysis in an organic solvent or in a gaseous phase have been renowned. Among other conventional methods, the socalled wet methods which produce particles by subjecting a raw material compound to hydrolysis or neutralization in a solution has found widespread acceptance because these methods easily permit control of the diameter of particles to be produced and prevention of produced particles from agglomeration into coarse lumps. In these wet methods, those of the class based on the hydrolysis of a metal alkoxide in an organic solvent have been attracting special attention because of their ability to produce particles having a narrow particle size distribution and excelling in dispersibility. The methods of this class include the method which obtains amorphous silica particles from tetraalkoxy silane as a raw material [W. Stober et al, "J. Colloid and Interface Science", 26, 62–69 (1968), etc.], the method which obtains hydrated titanium dioxide particles from tetraethoxy titanium as a raw material [Barringer et al, "Langmuir," 1, 414 (1985), etc.], and the method which obtains hydrated aluminum oxide particles from tri-secbutoxy aluminum as a raw material [D. L. Catone at al, "J. Colloid and Interface Science," 48, 291 (1974), etc.], for example.

From these articles of literature, basic reaction conditions for obtaining spherical discrete particles by the hydrolysis of an alkoxy metal compound in an organic solvent such as alcohol can be inferred. When the kind of an alkoxy metal compound as a raw material is fixed, however, the diameter of produced particles cannot be freely varied from a certain limit even by changing the kinds of organic solvent and catalyst, the composition of raw material, and the reaction conditions such as reaction temperature. Especially when a tetraalkoxy silane is adopted as a raw material and a monohydric alcohol as an organic solvent, though the diameter of produced silica particles increases in proportion as the number of carbon atoms of the monohydric alcohol increases, the maximum diameter attainable at all is limited to 2 $\mu$m. An attempt at heightening the concentration of produced particles or enlarging the diameter of produced particles by increasing the concentration of tetraalkoxy silane as a raw material with a view to commercial productivity has entailed a disadvantage that the produced particles have a widened particle size distribution and are liable to agglomerate into coarse lumps.

For the solution of this problem, Japanese Patent Laid-Open SHO 62(1987)-72,514 has disclosed a method for the production of silica particles which comprises hydrolyzing a tetraalkoxy silane in a water-containing alcohol solution thereby producing a slurry containing minute silica particles as seed particles and then continuing the supply of the alkoxy silane to the slurry thereby inducing growth of the seed particles. Though this method allows an addition to the diameter of produced particles, it cannot constitute an economic process for the production of discrete silica particles because an increase in the concentration of raw material for the purpose of enhancing the productivity only aggravates the occurrence of coarse lumps by agglomeration. Japanese Patent Laid-Open SHO 62(1987)-72,516 has disclosed a method which causes the existence of an alkali metal ion in a system having an alkoxy silane compound as a raw material sequentially supplied into an alcohol (monohydric alcohol) solution thereby effecting sequential growth of the diameter of particles being consequently formed therein. This method, however, is prone to a disadvantage that the produced silica particles suffer from inclusion of the alkali metal and the reaction calls for a long time and betrays inferior productivity.

An object of this invention, therefore, is to provide a novel method for the production of inorganic oxide particles.

Another object of this invention is to provide an economically advantageous method for the production of inorganic oxide particles of a desired diameter in a high concentration without entailing agglomeration of the produced particles into coarse lumps.

SUMMARY OF THE INVENTION

The objects described above are accomplished by a method for producing inorganic oxide particles of a freely controlled diameter by preparing a seed particle suspension having minute inorganic oxide particles dispersed as seed particles in a water-containing alcohol solution and adding a hydrolyzable or condensable organic metal compound to the suspension thereby causing growth of the seed particles, which method further comprises causing the water-containing alcohol solution to contain therein an alkylene glycol of 2 to 8 carbon atoms in an amount in the range of 1 to 50% by weight.

EXPLANATION OF THE PREFERRED EMBODIMENT

The term "water-containing alcohol solution" as used herein refers to a solution which has as essential components thereof water and an alcohol embracing the alkylene glycol (A) to be defined hereinafter and optionally contains, as occasion demands, a catalyst, an organic solvent other than the alcohol mentioned above, a surfactant, and the like.

The alcohol need not be limited to a monohydric alcohol but may embrace a dihydric and higher alcohols. The alcohols which are usable herein include monohydric alcohols such as methanol, ethanol, isopropanol, butanol, and isoamyl alcohol, dihydric alcohols such as ethylene glycol, diethylene glycol, propylene glycol, 1,4-butanediol, and hexanediol, and trihydric alcohols such as glycerol, for example. These alcohols may be used either singly or in the form of a mixture of two or more members. In the present invention, those of the aforementioned dihydric alcohols which possess 2 to 8 carbon atoms will be referred to as alkylene glycol (A). The present invention is characterized by defining the content of the alkylene glycol (A) in the water-containing alcohol solution as falling in the range of 1 to 50% by weight, preferably 1 to 30% by weight, based on the amount of the water-containing alcohol solution. If the alkylene glycol (A) content deviates from this range, the inorganic oxide particles prevented from forming coarse lumps by agglomeration allowed to acquire highly satisfactory dispersibility as aimed at by the present invention cannot be produced with high productivity.

The amount of the water in the solution is required to account for at least an equivalent weight necessary for effecting required hydrolysis of the organic metal compound. Since the water content affects the process of growth of seed particles, it must be controlled to a desirable level. The water content, therefore, is required to be in the range of 3 to 30% by weight, preferably 6 to 25 % by weight, based on the amount of the water-containing alcohol solution, though this range is variable with the kind of the organic metal compound to be used and the amount thereof to be contained in the solution. As examples of the catalyst to be placed in the solution for the purpose of controlling the hydrolysis or condensation of the organic metal compound, compounds capable of forming cations such as $NH_4$, $Na^+$, and $K^+$ or anions such as $SO_4^{2-}$ and $H_2PO_4^-$ and organic amine compounds such as ethanolamine, isopropanolamine, and tetramethylammonium hydroxide may be cited. The presence or absence of the use of this catalyst in the solution and the amount of the catalyst to be used are to be selected, depending on the kind of raw materials to be used.

Such an organic solvent other than alcohol as dioxane, acetone, diethyl ether, ethyl acetate, benzene, toluene, or hexane or an anionic, cationic, or nonionic surfactant may be incorporated in the solution for the purpose of an hencing the dispersibility of the formed particles in the solution.

The minute inorganic oxide particles to be used as seed particles in the present invention (hereinafter referred to as "seed particles") may be in the form of powder or in the form of slurry so long as the seed particles have an average particle diameter in the range of 0.01 to 10 μm. The materials which are advantageously usable for the seed particles include inorganic oxides which have silicon oxide, titanium dioxide, zirconium oxide, aluminum oxide, and the like as main components, for example. Among other inorganic oxides mentioned above, those organic oxides which contain at least the same metal element as that of the organic metal compound to be used for the reaction inducing the growth of the seed particles prove to be particularly preferable.

The inorganic oxide particles to be obtained in consequence of the growth of seed particles (hereinafter referred to as "grown particles") have their behavior affected appreciably by the seed particles. Specifically for the produced particles to acquire highly preferable discreteness and dispersibility, the particle size distribution of the seed particles and the presence or absence of agglomerated coarse lumps demand due consideration and the fact that the seed particles are dispersed in a discrete manner in the water-containing alcohol solution forms an essential requirement. Further, it has been found that the discrete manner of the produced particles is affected by the properties of the seed particle. The expression "dispersion in a discrete manner" as used herein refers to the state of relevant particles having a uniform shape, showing a sharp particle size distribution, and containing virtually no agglomerated coarse lumps.

The seed particles dispersible in a discrete manner can be obtained, for example, by a method which comprises neutralizing water glass as with an acid or an ion-exchange resin in an aqueous solution thereby forming silica water sol, a method which comprising gasifying an organic metal compound and condensing the gasified organic metal compound by pyrolysis or hydrolysis, or a method which comprises hydrolyzing and condensing an organic metal compound such as a metal alkoxide in a hydrated organic solvent solution.

The seed particles described above are dispersed in a discrete manner in a water-containing alcohol solution before they are subjected to the reaction inducing growth thereof. This dispersion is preferable to be carried out by a procedure which comprises causing the seed particles to be dispersed in a discrete manner in part of the solution thereby preparing a slurry having the seed particles dispersed in a discrete manner and subsequently joining this slurry with the remainder of the solution thereby obtaining the water-containing alcohol solution having the seed particles dispersed in a discrete manner therein. Specifically, this dispersion is accomplished by any of the conventional methods available for the production of slurry of seed particles. These known methods include a method which resides in converting water glass into silica water sol and a method which obtains a slurry of minute inorganic oxide particles by hydrolyzing and condensing an organic metal compound such as a metal alkoxide, for example. As a preferred slurry having the seed particles dispersed in a discrete manner, a dispersion having minute inorganic oxide particles spread in a discrete manner in an alkylene glycol may be cited. The discrete dispersion of the seed particles in the alkylene glycol can be obtained by substituting the alkylene glycol for the solvent in the slurry of silica water sol or minute inorganic oxide particles in an organic solvent, for example. The use of the seed particles in the form of a discrete dispersion in the alkylene glycol is preferable in the sense that the effect of this invention which resides in preventing the produced particles from agglomerating into coarse lumps even when the concentration of the produced particles is increased can be enhanced. Though what causes this enhancement of the effect remains yet to be elucidated, it may be logically explained by a postulate that the dispersion enhances the affinity of the surface of the seed particles for the alkylene glycol. This postulate finds a support in the fact that the effect of preventing the agglomeration of formed particles is manifested conspicuously when the alkylene glycol is bonded to the surface of the seed particles and the amount of the alkylene glycol so bonded is not less than 0.003 m.mol, preferably not less than 0.01 m. mol, more preferably in the range of 0.5 to 5 m.mol, per g of the seed particles.

For the production of the discrete dispersion of the minute inorganic oxide particles in the alkylene glycol, the method discloses in Japanese Patent Laid-Open SHO 63(1988)-185,439 or the method in U.S. Pat. No. 2,921,913 can be adopted.

For example, according to the method disclosed in Japanese Paten Laid-Open No. SHO 63(1988)-185,439, pressure during the heat treating may be reduced, normal, or high pressure, but the normal pressure is preferable for operation and advantageous. A temperature for heat-treatment (T°C.) is preferable in the range of $70 \leq T \leq T_B + 10$, wherein $T_B \geq 70$, when a boiling point of the alkylene glycol under the operation pressure is $T_b$°C., preferably $T_B \leq T \leq T_B + 10$. The $T_B$ is a value defined by boiling curve which shows a pressure-boiling relation of a single glycol if the glycol is one king or by a boiling curve which shows a pressure-boiling relation of a mixed glycol if the glycol is a mixture of two or more kinds.

For example, the glycol is ethylene glycol, the $T_B$ is 197.6 (normal pressure), 100(18 Torr), and 75(4.1 Torr). If the pressure is similarly defined, it is defined about the other glycols.

The reason why T is sometimes beyond $T_B$ is elevation of boiling point of the alkylene glycol by the minute particles. Therefore, the upper limit $(T_B+10)$°C. of the temperature of heat-treatment (T°C.) means the upper limit of the temperature considering the elevation of the boiling point. The temperature of heat-treatment is higher, effect of dispersion stability is high, and the effect can be obtained for a short treatment time, but the temperature is lower, the time is longer. In cast of $T<70$, effect of heat-treatment is low and it is not preferable.

The method which comprises adding the seed particles as a discrete dispersing element to the alkylene glycol and finally obtaining a suspension of the seed particles in the water-containing alcohol solution constitutes itself the most preferable embodiment in the sense that the seed particles can be easily dispersed in a discrete manner in the solution and, at the same time, the addition of the alkylene glycol can be simultaneously carried out.

The inorganic oxides, namely the minute inorganic oxide particles as seed particles and the inorganic oxide particles as grown particles in the present invention, are defined as an oxygen compound of metal in which metal atoms form a three-dimensional network through the medium of bonds thereof with oxygen atoms. The metal atoms in the particles further embrace those groups which partially avoid participating in the network such as, for example, nonhydrolyzable groups originating in the starting material, unaltered hydrolyzable residues, hydroxyl group, and treating groups arising from the coupling agent.

The organic metal compound which is the raw material for the grown particles is a compound which possesses a hydrolyzable organic group and exhibits an ability to form a three-dimensional (metal-oxygen) bond chain through hydrolysis and condensation. The compounds which answer this description and which are commercially available and inexpensive and usable advantageously herein include alkoxy metal compounds of silicon, titanium, zirconium, and aluminum, for example. These compounds are represented by the general formula I:

$$R^1_m M(OR^2)_n \qquad (I)$$

wherein M is a metal atom, $R^1$ is hydrogen atom or at least one group selected from the class consisting of an alkyl group of 1 to 10 carbon atoms, preferably 1 to 4 carbon atoms, which may be a substituent, an aryl group, and an unsaturated aliphatic residue, $R^2$ is an alkyl group, m is 0 or a positive integer, n is an integer of at least 1, m+n satisfies the valency of the metallic element M, mR's may be from one another, and n $R^2$'s may be different from one another. Preferable examples of M include silicon, titanium, zirconium, and aluminum.

$R^2$ is preferable to be a lower alkyl group of 1 to 8 atoms, preferably 1 to 4 carbon atoms. An alkoxy metal compound having an integer of 3 or more as n can be used by itself. An alkoxy metal compound having an integer of 1 or 2 as n may be used in combination with a raw material possessing at least three hydrolyzable organic groups. Typical examples of the organic metal compound represented by the general formula I, $R^1_m M(OR^2)_n$, include tetramethoxy silane, tetraethoxy silane, tetraisopropoxy silane, tetrabutoxy silane, trimethoxy silane, triethoxy silane, methyl trimethoxy silane, trimethoxyvinyl silane, triethoxyvinyl silane, 3-glycidoxypropyltrimethoxy silane, 3-chloropropyltrimethoxy silane, 3-mercaptopropyltrimethoxy silane, 3-(2-aminoethylaminopropyl)trimethoxy silane, phenyltrimethoxy silane, phenyltriethoxy silane, dimethoxydimethyl silane, dimethoxymethyl silane, diethoxymethyl silane, diethoxy-3-glycidoxypropylmethyl silane, 3-chloropropyldimethoxyme thyl silane, dimethoxydiphenyl silane, dimethoxydimethylphenyl silane, trimethylmethoxy silane, trimethylethoxy silane, dimethylethoxy silane, dimethoxydiethoxy silane, titanium tetramethoxide, titanium tetraethoxide, titanium tetraisopropoxide, titanium tetrabutoxide, titanium diethoxydibutoxide, zirconium tetramethoxide, titanium tetra(2-ethylhexyloxide), aluminum trimethoxide, aluminum triethoxide, aluminum triiospropoxide, and aluminum tributoxide.

Other preferable organic metal compounds are derivatives of the alkoxy metal compounds mentioned above. These derivatives include compounds which are obtained by substituting a group such as a carboxyl group or $\alpha$ $\beta$-dicarbonyl group which is capable of forming a chelate compound for part of the alkoxy groups (OR$^2$) in the alkoxy metal compounds and low condensates obtained by partially hydrolyzing the alkoxy metal compounds or alkoxy group-substituted compounds, for example.

The other organic metal compounds which are usable herein include acylated compounds of titanium, zirconium, or aluminum such as zirconium acetate, zirconium oxalate, zirconium lactate, titanium lactate, and aluminum lactate, chelate compounds between titanium zirconium, or aluminum and a glycol, a betadiketone, a hydroxy carboxylic acid, a ketoalcohol, an aminoacid, and a quivalive such as titanium acetyl acetanate, and aluminum acetyl acetanate.

The grown particles are formed from the seed particles and the organic metal compound mentioned above as their raw materials. Optionally, during the course of the reaction for growth of the seed particles, the hydrolysis may be carried out in the presence of an organic metal compound or an inorganic salt of sodium, potassium, rubidium, cesium, magnesium, calcium, strontium, barium, boron, gallium, indium, tin, iron, or copper in addition to the organic metal compound, to produce particles of a composite of the oxide of silicon, titanium, zirconium and/or aluminum and the oxide of the aforementioned metal. In this case, though the ratio of the oxide of silicon, titanium, zirconium and/or aluminum to the final grown particles including the composition of the seed particles is not specifically defined, it is desired to be not less than 70% by weight.

As described above, this invention is directed to a method which comprises dispersing seed particles in a water-containing alcohol solution containing an alkylene glycol in an amount falling in a specified range thereby obtaining a suspension of seed particles and adding an organic metal compound to the suspension thereby effecting growth of the seed particles owing to the ensuing reaction. The method employed to execute this reaction is not specifically defined. For example, a method which comprises placing the suspension of seed particles in its whole amount at once in a reaction vessel provided with a stirring device and thereafter adding the organic metal compound continuously or intermittently to the suspension, a method which comprises continuously supplying the suspension of seed particles and the organic metal compound to the aforementioned reaction vessel or to a tubular line mixer, a batchwise method, a continuous method, or the combination of such methods may be employed. The raw materials such as the seed particles, the alkylene glycol, an alcohol other than the alkylene glycol, water, a catalyst, an organic solvent other than alcohol, and the organic metal compound may be supplied as severally divided. In this case, the expression "water-containing alcohol solution" refers to the solution of a composition of the aforementioned raw materials minus the seed particles, the organic metal compound, and the products of their decomposition.

In the reaction of the growth, the reaction temperature is proper in the range of 0° to 100° C., preferably 0° to 50° C. The reaction time is sufficient in the range of 10 minutes to 5 hours, though variable with the reaction temperature, the kind and amount of the catalyst, and other reaction conditions.

In the production of inorganic oxide particles possessing a freely selected particle diameter by preparing a suspension having seed particles dispersed in a water-containing alcohol solution and adding to the suspension a hydrolyzable and condensable organic metal compound thereby effecting growth of the seed particles, the method of this invention which causes the presence of an alkylene glycol in an amount falling within a prescribed range in the water-containing alcohol solution is effective in preventing the occurrence of agglomerated lumps, increasing the concentration of particles, and curtailing the reaction time as compared with the conventional method. The method for the production of inorganic oxide particles according with the present invention, therefore, enjoys high productivity and inexpensiveness. The inorganic oxide particles obtained by this method contain no coarse lumps formed by agglomeration. Further, when the seed particles and the reaction conditions are suitably selected, there can be obtained amorphous and spherical particles possessing an average particle diameter in the range of 0.1 to 20 μm, preferably 0.5 to 15 μm, and a coefficient of variation of not more than 10%, preferably not more than 5%, and dispersed in a discrete manner.

Now, the present invention will be described more specifically below with reference to working examples, which are intended to be merely illustrative of and not in any sense limitative of the invention.

The physical properties of the minute spherical particles obtained in the working examples and controls were analyzed and evaluated by the following methods.

* Average particle diameter and value of standard deviation:

The average and the standard deviation of diameters of spherical particles are obtained by photographing 200 sample particles with an electron microscope (produced by Hitachi, Ltd. and marketed under product code of "S-570") and examining the electron micrograph with the aid of an image processing device (produced by Pias and marketed under product code of "LA-1000").

$$\text{*Coefficient of variation (\%):} = \frac{\text{Value of standard deviation}}{\text{Average particle diameter}} \times 100$$

$$\text{wherein the average particle diameter } (\overline{X}) = \frac{\sum_{i=1}^{n} X_i}{n}$$

$$\text{Standard deviation } (\delta_{n-1}) = \sqrt{\frac{\sum_{i=1}^{n} (\overline{x} - x_i)^2}{n-1}}$$

* Presence or absence of agglomerated lumps:

A sample slurry containing grown particles is directly observed under an optical microscope at 1,000 magnifications and evaluated.

When the particles in the slurry are dispersed in a discrete manner, there is a fixed correlation between the average particle diameter obtained with the aid of the electron microscope and that obtained with the aid of a centrifugal sedimensation type particle size distribution tester. When the particles are agglomerated, there arises a deviation from the fixed correlation. The degree of this agglomeration can be judged by the extent of this deviation. The degree of presence to absence of agglomerated lumpsis rated on the following four-point scale:

⊙ Complete absence of agglomerated lump.
○ Presence of very few agglomerated lumps
△ Presence of a number of agglomerated lumps
✕ Presence of numerous agglomerated lumps

EXAMPLE 1

In a reaction vessel of glass having an inner volume of 2 liters and provided with a stirrer, a dropping port, and a thermometer, 707.3 g of ethanol, 275.3 g of 28% aqua ammonia, and 24.0 g of water were mixed. The resultant mixed solution was adjusted at 30°±0.5° C. and stirred and, at the same time, 134.1 g of tetraethoxy silane was added thereto through the dropping port over a period of 1 hour. The mixture resulting from the dropwise addition was stirred for 1 hour to cause hydrolysis and condensation, to obtain a suspension of minute spherical silica particles (1-a).

With an evaporator, the suspension and 100 g of ethylene glycol added thereto were concentrated under normal pressure and, after the internal temperature reached 150° C., heated at this temperature for 1 hour, to obtain an ethylene glycol slurry of minute spherical silica particles having ethylene glycol bonded thereto (minute particle concentration 26.8% by weight). This was labelled as "seed particle slurry (1-b)."

In a reaction vessel of glass having an inner volume of 2 liters and provided with a stirrer, a dropping port, and a thermometer, 586.9 g of methanol, 267.9 g of 28% aqua ammonia, 52 g of ethylene glycol, and 33.2 g of the seed particle slurry (1-b) were mixed dropwise. The resultant mixed solution was adjusted at 20°±1° C. and stirred and, at the same time, a solution of 373 g of tetraethoxy silane in 187 g of methanol was added thereto through the dropping port over a period of 3 hours. The mixture resulting from the dropwise addition was stirred continuously for 1 hour to cause hydrolysis and condensation and induce growth of the seed particles, to obtain a suspension of minute spherical silica particles (1−c). The results are shown in Table 1.

EXAMPLE 2

In a reaction vessel of glass having an inner volume of 2 liters and provided with a stirrer, a dropping port, and a thermometer, 397.1 g of methanol, 204.7 g of 28% aqua ammonia, 1.4 g of water, 75 g of ethylene glycol, and 261.8 g of the suspension of minute spherical silica particles (1-a) ($SiO_2$ content 3.4% by weight) were mixed. The resultant mixed solution was adjusted at 20°±1° C. and stirred and, at the same time, a solution of 373 g of tetraethoxy silane in 187 g of methanol was added dropwise thereto through the dropping port over a period of 3 hours. The mixture resulting from the dropwise addition was stirred continuously for 1 hour to cause hydrolysis and condensation and induce growth of the seed particles, to obtain a suspension of minute spherical silica particles. The results are shown in Table 1.

EXAMPLE 3

The procedure of Example 1 was faithfully repeated, except that propylene glycol was used in the place of ethylene glycol. The results are shown in Table 1.

EXAMPLE 4

In reaction vessel of glass having an inner volume of 2 liters and provided with a stirrer, a dropping port, and a thermometer, 675.4 g of methanol and 275.3 g of 28% aqua ammonia were mixed. The resultant mixed solution was adjusted at 20°±0.5° C. and stirred and, at the same time, a solution of 111.8 g of tetramethoxy silane in 55.9 g of methanol was added dropwise thereto through the dropping port over a period of 1 hour. The mixed solution resulting from the dropwise addition was stirred continuously for 1 hour to cause hydrolysis and condensation and obtain a suspension of minute spherical silica particles (4-a).

With an evaporator, the suspension and 150 g of ethylene glycol added thereto were concentrated under normal pressure and, after the internal temperature reached 190° C., heated continuously for 1 hour, to obtain an ethylene glycol slurry of minute spherical silica particles having ethylene glycol bonded thereto (minute particle concentration 28.0% by weight). This was labelled as seed particle slurry (4-b).

In a reaction vessel of glass having an inner volume of 2 liters and provided with a stirrer, a dropping port, and a thermometer, 329.7 g of methanol, 267.9 g of 28% aqua ammonia, 24.0 g of water, and 71.4 g of the seed particle slurry (4-b) were mixed. The resultant mixed solution was adjusted to 20°±1° C. and stirred and, at the same time, a solution of 538 g of tetramethoxy silane in 269 g of methanol was added dropwise thereto through the dropping port over a period of 1 hour. The mixture resulting from this dropwise addition was stirred continuously for 1 hour to cause hydrolysis and condensation and consequent growth of seed particles, to obtain a suspension of minute spherical silica particles. The results are shown in Table 1.

EXAMPLE 5

With an evaporator, the suspension of minute spherical silica particles (1-a) obtained in Example 1 was concentrated to dryness. The powder consequently obtained was fired at 400° C. for 1 hour. The powder was added to methanol and treated with ultrasonic wave for thorough dispersion of the powder therein. The dispersion was passed through a filter paper to obtain a slurry of seed particles (5-b).

In a reaction vessel of glass having an inner volume of 2 liters and provided with a stirrer, a dropping port, and a thermometer, 567.1 g of methanol, 267.9 g of 28% aqua ammonia, 75.0 g of ethylene glycol, and 30.0 g of the seed particle slurry (5-b) ($SiO_2$ content 25.8% by weight) were mixed. The resultant mixed solution was adjusted to 20°±1° C. and stirred and, at the same time, a solution of 373 g of tetraethoxy silane in 187 g of methanol was added dropwise through the dropping port over a period of 3 hours. The mixture resulting from the dropwise addition was stirred continuously for 1 hour to cause hydrolysis and condensation and induce growth of the seed particles, to obtain a suspension of minute spherical silica particles. The results are shown in Table 1.

EXAMPLE 6

With an evaporator, the suspension of minute spherical silica particles (1-c) obtained in Example 1 and 500 g of ethylene glycol added thereto were concentrated under normal pressure and heated at an internal temperature of 197.6° C. for 1 hour to effect gradual expulsion of ethylene glycol by distillation and produce an ethylene glycol slurry of minute spherical silica particles having ethylene glycol bonded thereto (minute particle concentration 31.2% by weight). This was labelled as seed particle slurry (6-b).

In a reaction vessel of glass having an inner volume of 2 liters and provided with a stirrer, a dropping port, and a thermometer, 389.7 g of methanol, 267.9 g of 28% aqua ammonia, 60 g of ethylene glycol, and 51.4 g of the seed particle slurry (6-b) were mixed. The resultant mixed solution was adjusted to 20°±1° C. and stirred and, at the same time, a solution of 487 g of tetraethoxy silane in 244 g of methanol was added dropwise through the dropping port over a period of 3 hours. The mixture resulting from the dropwise addition was stirred continuously for 1 hour to cause hydrolysis and condensation and effect growth of the seed particles and produce a suspension of minute spherical silica particles (6-c).

EXAMPLE 7

With an evaporator, 1,000 g of the suspension of minute spherical silica particles (6-c) obtained in Example 6 and 350 g of ethylene glycol added thereto were concentrated under normal pressure and heated at an internal temperature of 197.6° C. for 1 hour to effect gradual expulsion of ethylene glycol by distillation, to obtain an ethylene glycol slurry of minute spherical silica particles having ethylene glycol bonded thereto (minute particle concentration 25.0% by weight). This was labelled as seed particle slurry (7-b).

In a reaction vessel of glass having an inner volume of 2 liters and provided with a stirrer, a dropping port, and a thermometer, 372.8 g of methanol, 294.6 g of 28% aqua ammonia, 37.2 g of ethylene glycol, and 60.4 g of the seed particle slurry (7-b) were mixed. The resultant mixed solution was adjusted to 20°±1° C. and stirred and, at the same a solution of 490 g of tetramethoxy silane in 245 g of methanol was added dropwise thereto through the dropping port over a period of 2 hours. The mixture resulting from the dropwise addition was stirred continuously to cause hydrolysis and condensation and effect consequent growth of the seed particles and obtain a suspension of minute spherical silica particles. The results are shown in Table 1.

EXAMPLE 8

In a reaction vessel of glass having an inner volume of 2 liters and provided with a stirrer, a dropping port, and a thermometer, 1386.7 g of methanol and 11.3 g of water were mixed. The resultant mixed solution was adjusted to 20°±0.5° C. and stirred and, at the same time, a solution of 60 g of tetraisopropoxy titanate in 60 g of methanol was added dropwise thereto through the dropping port over a period of 1 hour. The mixture resulting from the dropwise addition was stirred continuously for 1 hour to cause hydrolysis and condensation and obtain a suspension of minute spherical titania particles.

With an evaporator, the suspension and 200 g of ethylene glycol added thereto were concentrated under normal pressure and heated at an internal temperature of 197.6° C. for one hour to obtain an ethylene glycol slurry of minute spherical titania particles having ethylene glycol bonded thereto (minute particle concentration 14.0% by weight). This was labelled as seed particle slurry (8-b).

In a reaction vessel of glass having an inner volume of 2 liters and provided with a stirrer, a dropping port, and a thermometer, 336.5 g of methanol, 267.9 g of 28% aqua ammonia, and 103.6 g of the seed particle slurry (8-b) were mixed. The resultant mixed solution was adjusted to 20°±1° C. and stirred and, at the same time, a solution of 264 g of tetramethoxy silane and 132 g of tetraisopropoxy titanate in 396 g of methanol was added dropwise thereto through the dropping port over a period of 4 hours. The mixture resulting from the dropwise addition was stirred continuously for 1 hour to cause hydrolysis and condensation and induce consequent growth of the seed particles and obtain a suspension of minute spherical titania-silica particles. The results are shown in Table 1.

EXAMPLE 9

In a reaction vessel of glass having an inner volume of 2 liters and provided with a stirrer, a dropping port, and a thermometer, 875.1 g of ethanol and 31.5 g of water were mixed. The resultant mixed solution was adjusted to 25°±0.5° C. and stirred and, at the same time, a solution of 134.1 g of tetrabutoxy zirconate in 134.1 g of ethanol was added dropwise thereto through the dropping port over a period of 1 hour. The mixture resulting from the dropwise addition was stirred continuously for 1 hour to cause hydrolysis and condensation and obtain a suspension of of minute spherical zirconia particles.

With an evaporator, this suspension and 350 g of ethylene glycol added thereto were concentrated under normal pressure and heated at an internal temperature of 197.6° C. for 1 hour to obtain an ethylene glycol slurry of minute spherical zirconia particles having ethylene glycol bonded thereto (minute particle concentration 15.0% by weight). This was labelled as seed particle slurry (9-b).

In a reaction vessel of glass having an inner volume of 2 liters and provided with a stirrer, a dropping port, and a thermometer, 515.5 g of ethanol, 267.9 g of 28% aqua ammonia, and 130.0 g of the seed particle slurry (9-b) were mixed. The resultant mixed solution was adjusted to 20°±1° C. and stirred and, at the same time, a solution of 200 g of tetramethoxy silane and 93.3 g of tetrabutoxy zirconate in 293.3 g of ethanol was added dropwise thereto through the dropping port over a period of 4 hours. The mixture resulting from the dropwise addition was stirred continuously for 1 hour to cause hydrolysis and condensation and effect consequent growth of the seed particles and produce a suspension of minute spherical zirconia-silica particles. The results are shown in Table 1.

EXAMPLE 10

In a reaction vessel of glass having an inner volume of 2 liters and provided with a stirrer, a dropping port, and a thermometer, 827.8 g of isopropanol, 191.3 g of 28% aqua ammonia, and 32.7 g of water were mixed. The resultant mixed solution was adjusted to 20°±0.5° C. and stirred and, at the same time, a solution of 98.0 g of aluminum triisopropoxide in 98.0 g of isopropanol was added dropwise thereto through the dropping port over a period of 1 hour. The mixture resulting from the dropwise addition was stirred continuously for 1 hour to cause hydrolysis and condensation and obtain a suspension of minute spherical alumina particles.

With an evaporator, this suspension and 270 g of propylene glycol added thereto were concentrated under normal pressure and heated at an internal temperature of 170° C. for 1 hour to obtain a propylene glycol slurry of minute spherical alumina particles having propylene glycol bonded thereto (minute particle concentration 15.0% by weight). This was labelled as seed particle slurry (10-b).

In a reaction vessel of glass having an inner volume of 2 liters and provided with a stirrer, a dropping port, and a thermometer, 448.8 g of isopropanol, 267.9 g of 28% aqua ammonia, and 63.3 g of the seed particle slurry (10-b) were mixed. The resultant mixed solution was adjusted to 20°±1° C. and stirred and, at the same time, a solution of 120 g of aluminum triisopropoxide and 240 g of tetramethoxy silane in 360 g of isopropanol was added dropwise thereto through the dropping port over a period of 4 hours. The mixture resulting from the dropwise addition was stirred continuously for 1 hour to cause hydrolysis and condensation and induce consequent growth of the seed particles and produce a suspension of minute spherical alumina-silica particles. The results are shown in Table 1.

Control 1

The procedure of Example 2 was faithfully repeated, except that methanol was substituted for ethylene glycol. The results are shown in Table 1.

Control 2

In a reaction vessel of glass having an inner volume of 2 liters and provided with a stirrer, a dropping port, and a thermometer, 467.1 g of methanol, 204.7 g of 28% aqua ammonia, 1.4 g of water, 5.0 g of ethylene glycol, and 261.6 g of the suspension of minute spherical silica particles (1-a) ($SiO_2$ content 3.4% by weight) obtained in Example 1 were mixed. The resultant mixed solution was adjusted to 20°±1° C. and stirred and, at the same time, a solution of 373 g of tetraethoxy silane in 187 g of methanol was added dropwise thereto through the dropping port over a period of 3 hours. The mixture resulting from the dropwise addition was stirred continuously for 1 hour to cause hydrolysis and condensation and induce consequent growth of the seed particles and produce a suspension of minute spherical silica particles. The results are shown in Table 1.

Control 3

In a reaction vessel of glass having an inner volume of 2 liters and provided with a stirrer, a dropping port, and a thermometer, 97.7 g of methanol, 541.2 g of ethylene glycol, 267.9 g of 28% aqua ammonia, and 33.2 g of the seed particle slurry (1-b) obtained in Example 1 (SiO$_2$ content of 26.8% by weight) were mixed. The resultant mixed solution was adjusted to 20°±1° C. and stirred and, at the same time, a solution of 373 g of tetraethoxy silane in 187 g of methanol was added dropwise thereto through the dropping port over a period of 3 hours. The mixture resulting from the dropwise addition was stirred continuously for 1 hour to cause hydrolysis and condensation and induce consequent growth of the seed particles and produce a suspension of minute spherical silica particles. The results are shown in Table 1.

Control 4

The procedure of Example 5 were faithfully repeated, except that methanol was substituted for ethylene glycol. The results are shown in Table 1.

TABLE 1

| | Used seed particle | | | Growth conditions of seed particles | | | |
|---|---|---|---|---|---|---|---|
| No. | Kind | Average particle diameter (μm) | Amount of bonded alkylene glycol and kind (mmol/g) | Used metal alkoxide | Used alkylene glycol and its content (wt %)* | Temperature (°C.) | Concentration of minute particle in suspension obtained (wt %) |
| Example 1 | silica | 0.96 | 2.0 (ethylene glycol) | tetraethoxy silane | ethylene glycol (8.0) | 20 | 7.8 |
| Example 2 | silica | 0.96 | 2.0 (ethylene glycol) | tetraethoxy silane | ethylene glycol (8.0) | 20 | 7.8 |
| Example 3 | silica | 0.96 | 1.1 (propylene glycol) | tetraethoxy silane | propylene glycol (8.0) | 20 | 7.8 |
| Example 4 | silica | 0.52 | 2.3 (ethylene glycol) | tetramethoxy silane | ethylene glycol (7.3) | 20 | 15.5 |
| Example 5 | silica | 0.96 | 0 (ethylene glycol) | tetraethoxy silane | ethylene glycol (8.0) | 20 | 7.7 |
| Example 6 | silica | 2.30 | 2.5 (ethylene glycol) | tetraethoxy silane | ethylene glycol (12.4) | 20 | 10.4 |
| Example 7 | silica | 5.03 | 2.5 (ethylene glycol) | tetramethoxy silane | ethylene glycol (10.8) | 20 | 13.9 |
| Example 8 | titania | 0.35 | 0.4 (ethylene glycol) | tetraisopesposy titanate tetramethoxy silane | ethylene glycol (12.8) | 20 | 10.4 |
| Example 9 | zirconia | 0.62 | 0.5 (ethylene glycol) | tetrabutoxy zirconate tetramethoxy silane | ethylene glycol (12.1) | 20 | 8.6 |
| Example 10 | alumina | 0.06 | 0.2 (propylene glycol) | aluminum triisopropoxide tetramethoxy silane | propylene glycol (6.6) | 20 | 10.9 |
| Control 1 | silica | 0.96 | 0 — | tetraethoxy silane | — (0.0) | 20 | 7.8 |
| Control 2 | silica | 0.96 | 0 — | tetraethoxy silane | ethylene glycol (0.5) | 20 | 7.8 |
| Control 3 | silica | 0.96 | 0 — | tetraethoxy silane | ethylene glycol (60.0) | 20 | 7.8 |
| Control 4 | silica | 0.96 | 0 — | tetraethoxy silane | — (0.0) | 20 | 7.8 |

| | | Properties of minute particles | | |
|---|---|---|---|---|
| No. | Minute particles obtained | Average particle diameter (μm) | Variation coefficient (%) | Existence of conglomerated lumps |
| Example 1 | spherical silica minute particle | 2.30 | 2.5 | ⊙ |
| Example 2 | spherical silica minute particle | 2.28 | 2.4 | ○ |
| Example 3 | spherical silica minute particle | 2.32 | 2.1 | ⊙ |
| Example 4 | spherical silica minute particle | 1.21 | 1.8 | ⊙ |
| Example 5 | spherical silica minute particle | 2.36 | 2.3 | ○ |
| Example 6 | spherical silica minute particle | 5.03 | 1.8 | ⊙ |
| Example 7 | spherical silica minute particle | 11.95 | 1.1 | ○ |
| Example 8 | spherical titania-silica minute particle | 0.77 | 8.1 | ○ |
| Example 9 | spherical zirconia-silica minute particle | 1.21 | 7.6 | ○ |
| Example 10 | spherical alumina-silica minute particle | 0.16 | 9.3 | ○ |
| Control 1 | spherical silica minute particle | 2.15 | 11.9 | Δ |
| Control 2 | spherical silica minute particle | 2.08 | 12.8 | Δ |
| Control 3 | spherical silica minute particle | 1.95 | 18.5 | Δ |
| Control 4 | spherical silica minute particle | 2.05 | 23.4 | X |

*Amount of alkylene glycol in a seed particle suspension.

What is claimed is:

1. A method for the production of inorganic oxide particles which comprises the steps of dispersing seed particles in an alkylene glycol having 2-8 carbon atoms to make a dispersion, heat-treating said dispersion of seed particles at a temperature (T°C.) falling in the following range: $70 < T < T_B + 10$ where in $T_B$ is the boiling point of said alkylene glycol and not less than 70° C. thereby bonding said alkylene glycol to the surface of said seed particles in a ratio of 0.003 to 5 m.mol per gram of said seed particles, adding said dispersion to a water-containing alcohol solution of an alkylene glycol having 2-8 carbon atoms, in an amount in the range of 1 to 50% by weight based on the amount water-containing alcohol solution, and adding hydrolyzable and condensable organic metal compound to said solution hydrolyzing and condensing said compound to effect growth of said seed particles to provide said inorganic oxide particles.

2. A method according to claim 1, wherein said organic metal compound is at least one member selected from the group consisting of alkoxy metal compounds represented by the general formula I:

$$R^1{}_m M(OR^2)_n$$

wherein M is a metal atom, $R^1$ is hydrogen atom or at lest one group selected from the class consisting of an alkyl group of 1 to 10 carbon atoms which may be substituent, an aryl group, and an unsaturated aliphatic residue, $R^2$ is an alkyl group, m is 0 or a positive integer, n for an integer of at least 1, m+n satisfies the valency of the metal element M, m $R^1$'s may be different from one another, and n $R^2$'s may be different from one another and derivatives of said alkoxy metal compounds.

3. A method according to claim 1, wherein said seed particles bind an alkylene glycol on the surface thereof in an amount of not less than 0.01 m mol per 1 gram of said seed particles.

4. A method according to claim 1, wherein said seed particles bind an alkylene glycol on the surface thereof in an amount in the range of 0.1 to 5 m.mol per 1 gram of said seed particles.

5. A method according to claim 1, wherein said seed particles and said inorganic oxide particles have as a main component thereof at least one member selected from the group consisting of silicon oxide, titanium dioxide, zirconium oxide, aluminum oxide, and composite oxides thereof.

6. A method according to claim 2, wherein M in said general formula I is at least one member selected from the group consisting of Si, Ti, Zr, and Al.

7. A method according to claim 1, wherein said inorganic oxide particles possess an amorphous spherical shape and an average particle diameter in the range of 0.1 to 20 μm, and a coefficient of variation of particle diameter of not more than 10%.

8. A method according to claim 1, wherein said water-containing alcohol solution contains 3 to 30% by weight of water therein.

9. A method according to claim 2, wherein $R^2$ in said general formula I stands for an alkyl group of 1 to 8 carbon atoms.

10. A method according to claim 1, wherein said alkylene glycol has 2 to 4 carbon atoms.

11. A method according to claim 1, wherein said seed particles have an average particle diameter in the range of 0 01 to 10 μm.

12. A method according to claim 1, wherein growth of said seed particles is effected at a temperature in the range of 0° to 100° C.

* * * * *